(12) United States Patent
Angel et al.

(10) Patent No.: US 7,543,612 B1
(45) Date of Patent: Jun. 9, 2009

(54) FUEL VENT RECOVERY SYSTEM

(75) Inventors: Bruce A. Angel, New Bern, NC (US); Glenn Lyle Spain, New Bern, NC (US); Kurt Bergstrom, New Bern, NC (US); Scott Wildermuth, New Bern, NC (US)

(73) Assignee: Brunswick Corporation, Lake Forest, IL (US)

(*) Notice: Subject to any disclaimer, the term of this patent is extended or adjusted under 35 U.S.C. 154(b) by 110 days.

(21) Appl. No.: 11/555,014

(22) Filed: Oct. 31, 2006

(51) Int. Cl.
*B65B 3/04* (2006.01)
*B63B 17/00* (2006.01)

(52) U.S. Cl. .................... 141/86; 141/311 A; 141/386; 114/343

(58) Field of Classification Search ............ 141/85–88, 141/311, 325, 326, 368, 383, 386; 114/211, 114/343, 364; 137/587
See application file for complete search history.

(56) References Cited

U.S. PATENT DOCUMENTS

| | | | |
|---|---|---|---|
| 4,082,125 A | 4/1978 | Wilson et al. | |
| 5,027,965 A * | 7/1991 | Dumars | 114/211 |
| 5,070,806 A | 12/1991 | Coster | |
| 5,230,372 A | 7/1993 | Westphal | |
| 5,322,099 A * | 6/1994 | Langlois | 141/307 |
| 5,469,800 A | 11/1995 | Brotz | |
| 5,662,149 A * | 9/1997 | Armellino | 141/86 |
| 5,692,547 A * | 12/1997 | Lehr | 141/86 |
| 5,715,876 A * | 2/1998 | Burt | 141/86 |
| 5,738,154 A | 4/1998 | Garvey, III | |
| 5,765,604 A | 6/1998 | Garvey, III | |
| 5,850,858 A * | 12/1998 | Zeigler | 141/86 |
| 5,875,825 A * | 3/1999 | Roberts, Jr. | 141/86 |
| 5,894,809 A * | 4/1999 | Grigaitis et al. | 114/343 |
| 5,950,688 A | 9/1999 | Langlois | |
| 5,975,154 A * | 11/1999 | Bennett | 141/59 |
| 5,979,513 A * | 11/1999 | Brand | 141/86 |
| 6,164,231 A | 12/2000 | Shimmell et al. | |
| 6,532,888 B1 * | 3/2003 | Enik | 114/343 |
| 6,929,039 B2 | 8/2005 | Vaitses | |
| 6,935,264 B2 | 8/2005 | Harris | |
| 7,210,423 B2 * | 5/2007 | Haugen | 114/183 R |

\* cited by examiner

*Primary Examiner*—Gregory Hudson
*Assistant Examiner*—Nicholas A Arnett
(74) *Attorney, Agent, or Firm*—Malin Haley DiMaggio Bowen & Lhota, P.A.

(57) ABSTRACT

A fuel vent recovery system for collecting and retaining fuel discharged through a fuel vent of a vessel. The system includes a hull-side fuel vent fitting, an annular elastomer seal, and a recovery container. The annular elastomer seal has an outer wall that is bifurcated by a groove to form two parallel annular flanges. The annular flanges and groove are fitted over and engage the wall of an aperture of the recovery container. The annular seal includes an inner wall that contacts a complementary seal interface surface of the fuel vent fitting. The annular seal is fitted around the fuel vent fitting. The recovery container is attached to the annular seal and thus sealed to the fuel vent fitting. The system prevents fuel discharged through the vessel's fuel vent from spilling into and contaminating the surrounding environment.

14 Claims, 5 Drawing Sheets

FUEL VENT RECOVERY SYSTEM

BACKGROUND OF THE INVENTION

1. Field of the Invention

The invention relates to a fuel vent recovery system for capturing fuel spillage and overflow occurring during fueling of a vessel and preventing the spilled fuel from entering and contaminating the surrounding environment.

2. Description of Related Art

Most boats and other vessels include fuel vents exiting through the hull. These fuel vents are required to release accumulated gases and to equalize pressure within the vessel's fuel tank, thereby maintaining atmospheric pressure within the tank at all times. Fuel may be expelled through the hull-side fuel vent of a vessel at any time in which the tank vent is covered with fuel and there is a positive pressure gradient, relative to atmospheric conditions, at the vent fitting within the tank. This fuel discharge is illegal under United States law due to the detrimental effects of fuel in the environment. Various devices have been created to recapture fuel discharged from a vessel through the vent line. The majority of said devices employ one or several hoses to direct gas discharged from a vent line to a recovery tank or container for storage until reuse or disposal. Many of these devices also require permanent installation within the hull of the vessel.

U.S. Pat. No. 6,935,264, issued to Harris on Aug. 30, 2005, describes a system for refueling a marine vehicle without spillage that includes a vacuum system for drawing fuel through a tube into an attached receptacle.

U.S. Pat. No. 6,929,039, issued to Vaitses on Aug. 16, 2005, describes a marine vessel fuel overflow tank system that is permanently installed inside the hull of a vessel.

U.S. Pat. No. 6,164,231, issued to Shimmell et al., on Dec. 26, 2000, describes an insert for a marine fitting through the hull of a vessel that includes an annular body with an outwardly extending lip. The lip directs discharged fuel away from the hull of the boat to prevent stains on the hull. The Shimmell invention does not include a means for capturing and containing the discharged fuel.

U.S. Pat. No. 5,950,688, issued to Langlois on Sep. 14, 1999, describes an apparatus and method for preventing fuel spillage that is permanently installed within the hull of the vessel and includes a valve assembly and by-pass line.

U.S. Pat. No. 5,765,604, issued to Garvey on Jun. 16, 1998, describes a boat hull attachment for eliminating gasoline spillage having a winged bracket that includes suction cups for attaching to the vessel hull. The '604 invention also includes a rubber gasket for fitting over the vent, however, said invention does not include a hull-side fuel vent fitting that is capable of being inserted into or over the fuel vent line.

U.S. Pat. No. 5,738,154, issued to Garvey on Apr. 14, 1998, describes a gasoline spill eliminating device including a connector member having a first section to extend into a container through an inlet opening in the wall of said container and a second section designed to fit firmly over and around an overflow vent stack that extends from the hull of a vessel.

U.S. Pat. No. 5,469,800, issued to Brotz on Nov. 28, 1995, describes a nautical fuel overflow protection device and method for preventing fuel discharge into the water surrounding a vessel. The Brotz invention includes an absorbent material to absorb and contain fuel spillage within a container and is permanently installed inside the hull of a vessel.

U.S. Pat. No. 5,230,372, issued to Westphal on Jul. 27, 1993, describes a fuel overfill recovery system including a fuel vent fitting connected to the outside hull of a vessel and diverting discharged fuel through a flexible hose into a collection container.

U.S. Pat. No. 5,070,806, issued to Coster on Dec. 10, 1991, describes a marine fuel overflow device includes a transparent filler hose connected to a fuel receptacle and a suspension unit and suction cup to restrain the fuel receptacle from movement.

U.S. Pat. No. 4,082,125, issued to Wilson et al., on Apr. 4, 1978, describes a spillage collection device for boat fuel tanks that includes a hollow receptacle connected to a vessel's hull by a support ring affixed telescopically around an air vent protruding from the hull. An upper portion of a rear wall of the hollow receptacle includes an elongated, open-ended, vertical slot for receiving the support ring to secure the receptacle to the hull.

SUMMARY OF THE INVENTION

The invention relates to a fuel vent recovery system comprising a hull-side fuel vent fitting, a rubber annular seal, and a recovery container. The hull-side fuel vent fitting has a hollow shank that serves as the vent inlet and a means to attach the fitting to the fuel vent line coming from the tank. The fitting's shank is long enough to supply adequate threads to the appropriate hull-side hardware and protrude to the exterior of the hull. Just outboard of the hull, the fitting's diameter increases slightly yet is still cylindrical providing a flange to seat the fitting to the hull side. Immediately outboard of the diameter step, the fitting begins to flare with a concave radius until it reaches a maximum diameter. At the point of maximum diameter the concave flare diverges into a spherical orb, which completely encapsulates the outlet other than a cutout or aperture that reveals the interior void of the hollow shank and the void within the orb. Thus, fuel can be expelled only through this cutout.

To capture the expelled fuel, a rubber annular ring fitted to an approved fuel container is used. The annular ring has a groove in its outer surface that forms a deep notch. The container has a hole cut out of one side that has a radius concentric to the depth of the groove in the annular ring. The wall of the hole through the container is fitted into the groove of the annular ring to form a seal. The container with annular ring tightly fitted in place can then be pressed over the fuel vent fitting. The annular ring has an inner diameter slightly smaller than the previously mentioned step up in diameter of the fuel vent fitting. This overlap in diameter provides the necessary tension in the rubber annular ring to properly seal the container to the fitting. It should be noted that the annular ring is pliable enough to allow easy installation over the fitting, and once installed provides adequate support to the container of expelled fuel.

Fuel discharged from the vessel, by way of the fuel vent line, passes through the hollow shank, is directed through the cutout of the spherical orb, and is collected in the recovery container, which is sealed to the fitting by the rubber annular ring. Discharged fuel is collected within the recovery container for subsequent reuse or disposal. The fuel vent recovery system prevents discharged fuel from spilling into and contaminating the environment surrounding the vessel.

An object of this invention is to provide a device to collect and retain any fuel that is discharged through the fuel vent system of a vessel to prevent said fuel from entering into the surrounding environment.

Another object of this invention is to provide a device to collect and retain fuel discharged from a vessel's fuel vent for later reuse or disposal.

Still another object of this invention is to provide a device for temporary installation to collect and retain fuel discharged from a vessel's fuel vent wherein said device is easily installed and uninstalled around the fuel vent on a vessel's hull.

In accordance with these and other objects which will become apparent hereinafter, the instant invention will now be described with particular reference to the accompanying drawings.

DETAILED DESCRIPTION

Figure 1:
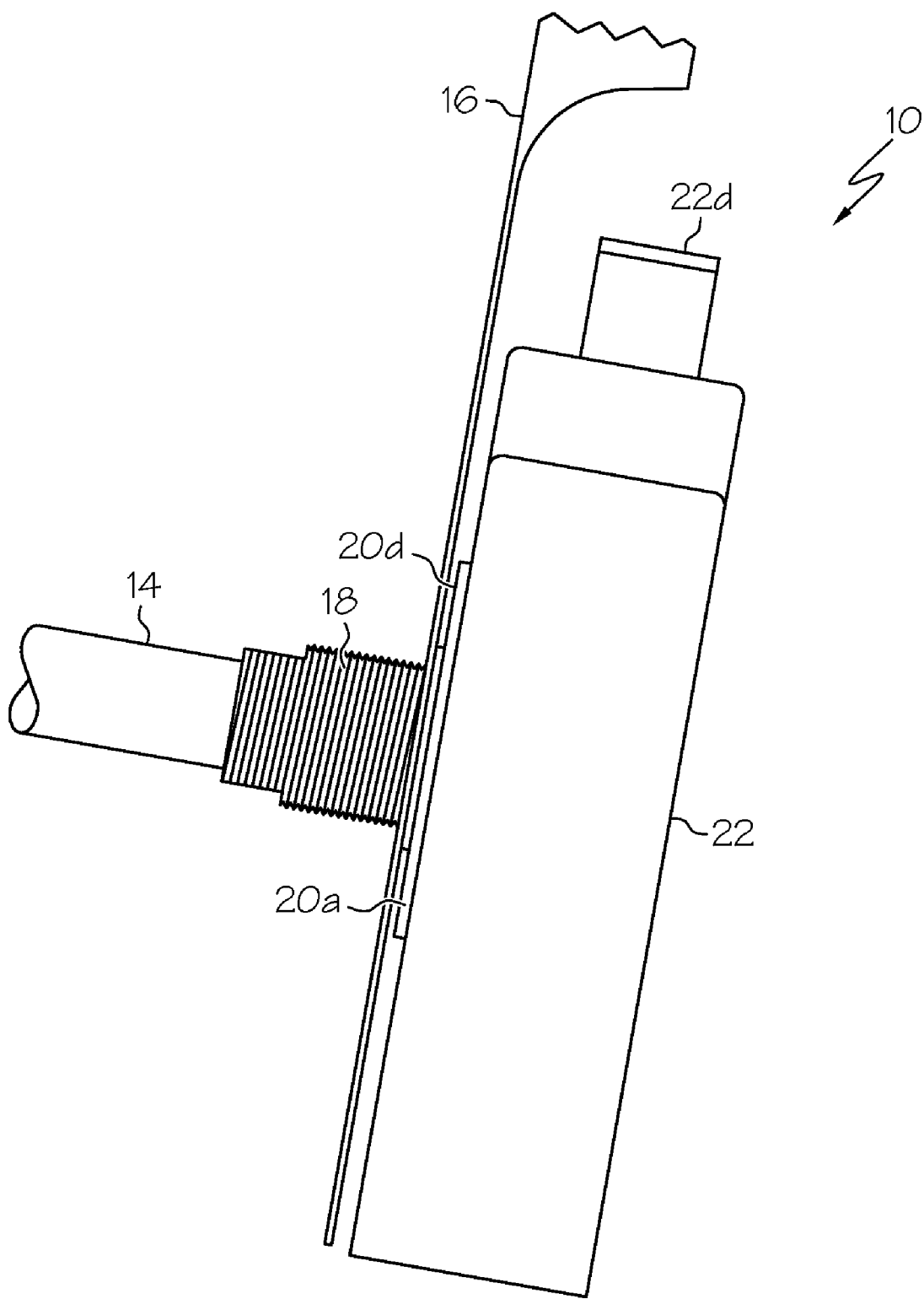
FIG. 1 shows a side view of the fuel vent recovery system connected to the hull of a vessel.
Figure 5:
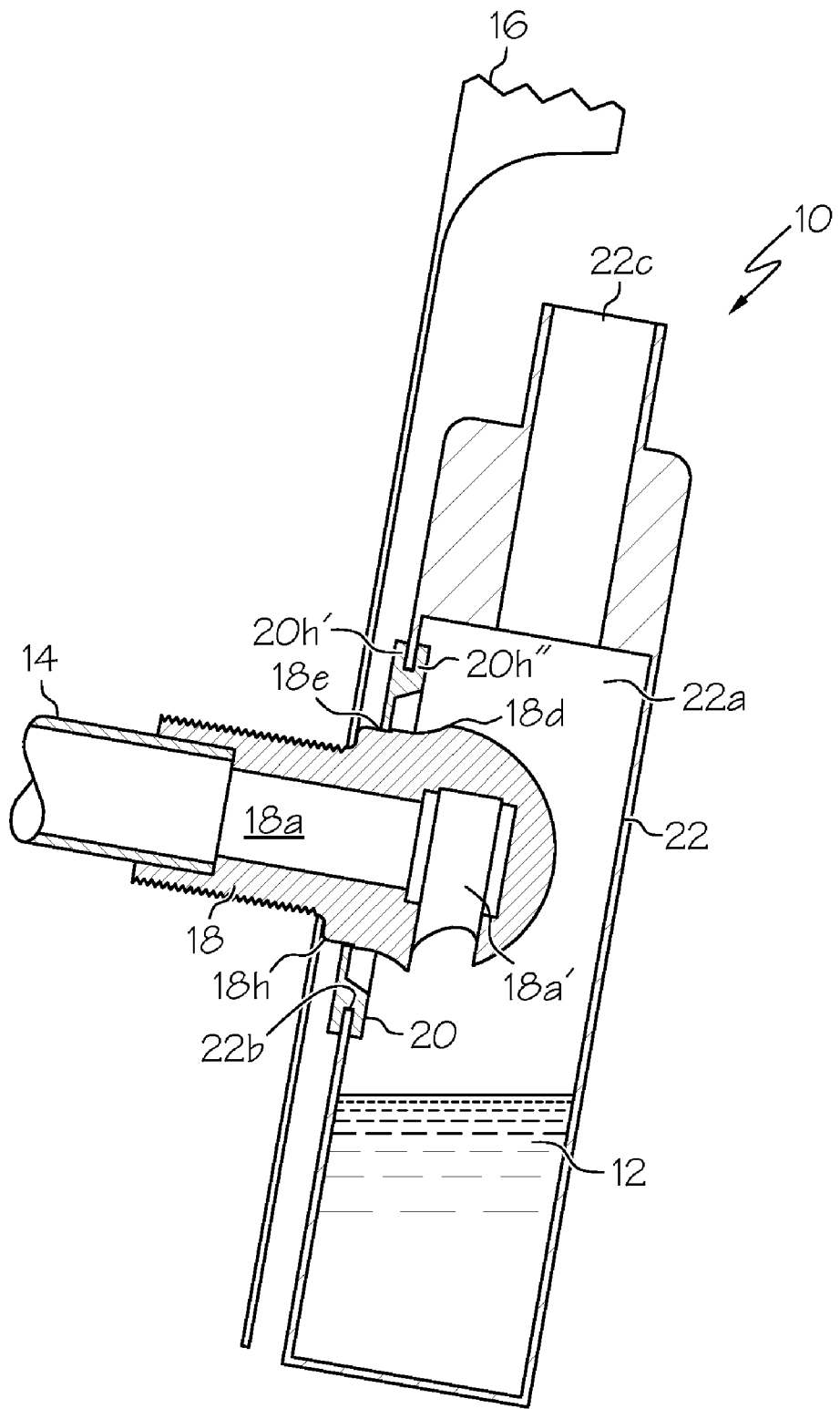
FIG. 5 shows a left-side cross-sectional view of the fuel vent recovery system connected to the hull of a vessel.

As depicted in FIGS. 1 and 5, the fuel vent recovery system 10 prevents and contains fuel 12 discharged from a fuel vent line 14 passing through the hull 16 of a vessel from entering and contaminating the surrounding environment. The fuel vent recovery system 10 comprises the hull-side fuel vent fitting 18, an annular ring 20, and a recovery container 22. The hull-side fuel vent fitting 18 is connected to the fuel vent line 14, which is attached to the vessel's tank.

Figure 3:
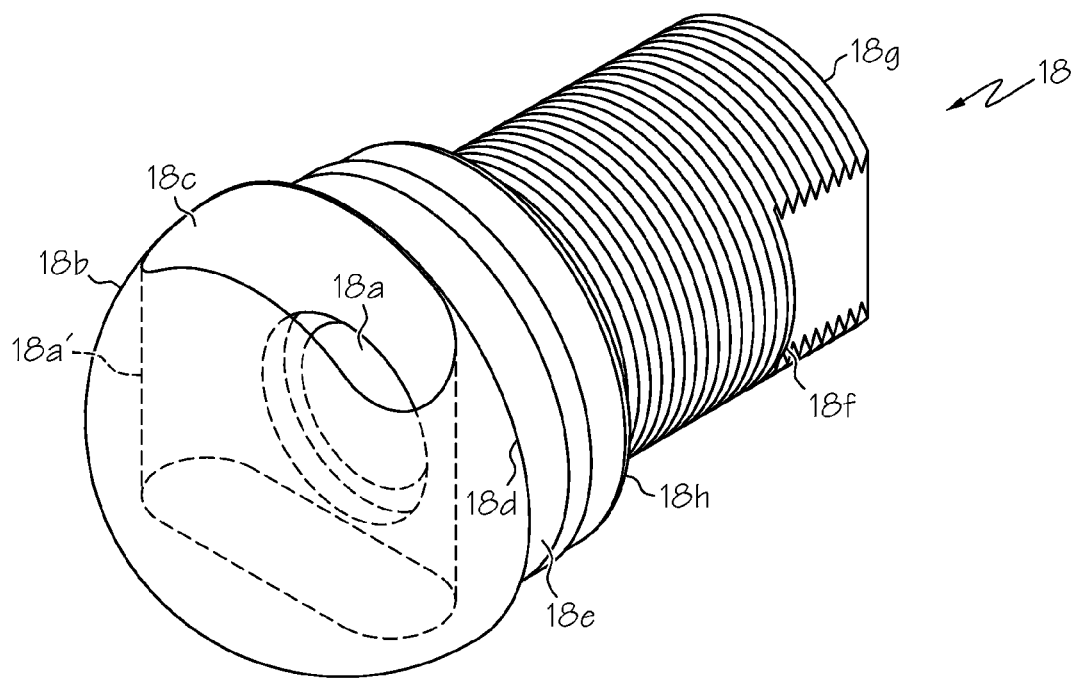
FIG. 3 shows a perspective view of the hull-side fuel vent fitting.

As shown in FIGS. 3 and 5, said hull-side fuel vent fitting 18 has a hollow shank end 18f that surrounds and defines an interior void 18a. Interior void 18a transforms into a void 18a' within a machined semi-spherical end 18b protruding outboard of the hull 16. The void 18a' forms an aperture, or discharge opening, 18c through which fuel discharged from the fuel vent 14 passes to empty into and be collected by recovery container 22. Said fuel vent fitting 18 further comprises the discharge opening, or vent outlet, 18c, an annular retaining ridge 18d, a seal interface surface or flare 18e, the hollow shank end 18f, and an outboard flange 18h that contacts the hull 16 of the vessel. The annular retaining ridge 18d extends around the exterior circumference of said fuel vent fitting 18 and preferably has a diameter that is greater than the diameter of the remainder of said fuel vent fitting. Proximal to the semi-spherical end 18b of the fuel vent fitting 18, said annular retaining ridge 18d flares laterally outward from the longitudinal axis of said fuel vent fitting. The annular retaining ridge 18d converges near the seal interface surface 18e of the fuel vent fitting 18. The seal interface surface 18e comprises a preferably flared or beveled surface that is concentric with the interior void 18a extending longitudinally through said fuel vent fitting 18. The hollow shank end 18f of said fuel vent fitting includes an opening, or vent inlet, 18g that communicates with fuel vent 14 when the fuel vent recovery system is attached over said fuel vent 14 to the hull 16 of the vessel. The outboard flange 18h of the fuel vent fitting 18 contacts the exterior surface of the vessel hull so that only the hollow shank end 18f passes through said hull to engage the fuel vent 14. The fuel vent fitting 18 is preferably constructed from one or more materials that are resistant to corrosion and degradation caused by exposure to hydrocarbon fuels, and other surrounding environmental conditions commonly encountered at sea.

The interior surface of the hollow shank end 18f of said fuel vent fitting 18 may be threaded to permit easy and secure engagement with the fuel vent 14. In the preferred embodiment of the fuel vent recovery system 10, the exterior surface of the hollow shank end 18f is threaded for engaging a nut or another threaded means for securing said shank end through and within the hull 16 of the vessel. Other means for connecting the shank end 18f to the hull 16 and to the fuel vent 14 are also contemplated, including the use of epoxy resins, glues, and other adhesives and sealants, soldering, welding, pounding of the shank end of the fuel vent fitting 18 into the hull of the vessel and/or over the fuel vent line 14, and by the use of any other suitable retaining means. Preferably, the fuel vent fitting 18 is permanently connected to the fuel vent line 14, while the recovery container 22 and annular seal 20 are temporarily and removably connected to said fuel vent fitting 18 during fueling of the vessel.

The annular retaining ridge 18d or lip of the fuel vent fitting 18 serves to impede fuel 12 escaping vent outlet 18c from dripping or running back down the hollow shank end 18f to the hull vessel 16. Without the annular retaining ridge 18d, fuel 12 could form droplets around the vent outlet 18c that could travel down the hollow shank 18f and run down the hull of the vessel. Thus, annular retaining ridge 18d eliminates the fuel drip stains that commonly occur on the hulls of vessels by causing fuel droplets to collect thereon until said droplets fall into the recovery container 22.

Figure 4:
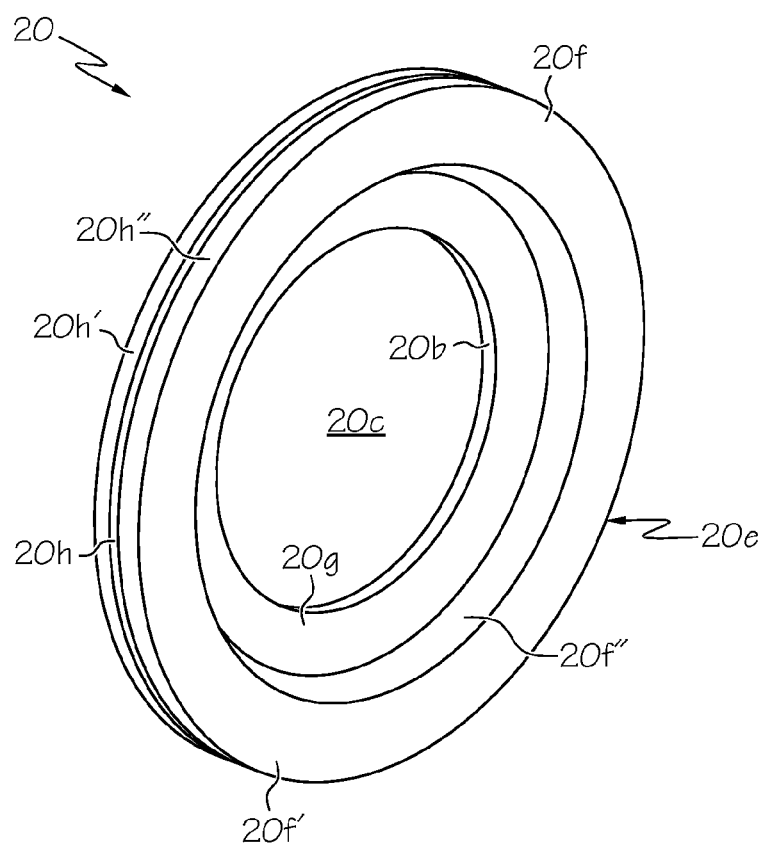
FIG. 4 shows a perspective view of the annular seal.

As illustrated in FIG. 4 of the invention, the annular ring seal 20 comprises an outer wall 20a and an inner wall 20b that defines a central aperture 20c. The diameter of the central aperture 20c is less than the diameter of the annular retaining ridge 18d of said fuel vent fitting 18. Said annular seal 20 further comprises a generally planar first side 20d and a second side 20e having a protruding planar surface 20f encircling a recessed surface 20g surrounding the central aperture 20c. The protruding planar surface 20f comprises a top planar surface 20f' and an inner wall 20f'' and the outer wall 20a of said annular seal. Preferably, said inner wall 20f' of the protruding planar surface 20f is beveled while said outer wall 20a is perpendicular in relation to the plane of the first side 20d of the annular seal 20. The space defined by the inner wall 20f' of the protruding planar surface 20f and the recessed surface 20g of said annular seal 20 accommodates the seal interface surface 18e of the fuel vent fitting 18. The inner wall 20b and flared seal interface surface 18e of the fuel vent fitting 18 are geometrically complementary in shape to produce a tight, secure fit between said annular ring 20 and said fuel vent fitting 18. When fueling the vessel, inner wall 20b of the annular seal 20 is seated on the seal interface flare 18e of the fuel vent fitting 18, thereby effectively joining the annular ring seal 20 and fuel vent fitting 18 with a tight seal. The inner wall 20b of the annular seal 20 contacts and securely engages said flared seal interface surface 18e. In an alternate embodiment of the fuel vent recovery system 10, the geometry of the annular seal 20 and the fuel vent fitting 18 may be constructed such that the inner wall 20f'' of the protruding planar surface 20f contacts the seal interface flare 18e of said fuel vent fitting 18. Preferably, the annular seal 20 is constructed from either natural or synthetic elastomer material that is resistant to corrosion or degradation caused by exposure to hydrocarbon fuels.

In the preferred embodiment of the fuel vent recovery system 10, the outer wall 20a of annular seal 20 is bifurcated by annular groove 20h. The groove 20h divides said outer wall 20a into two annular flanges 20h' and 20h" that receive a wall 22e, which surrounds and defines an aperture 22b of the recovery container 22. The annular flanges 20h' and 20h" hold said wall 22e securely within groove 20h. Said annular flanges 20h' and 20h" concentrically surround groove 20h. As shown in FIG. 4, each annular flange includes an outer surface, an inner surface, and a top surface. The annular flange 20h' is coplanar with and forms part of the planar first side 20d of said annular seal 20. Likewise, the annular flange 20h" is coplanar with and forms part of the protruding planar surface 20f of the second side 20e of said annular seal 20. In an alternate embodiment, annular flange 20h" of said annular seal 20 may be recessed so as to provide said annular flange with a thickness that is less than the thickness defined by the distance measured between the protruding planar surface 20f of the annular seal's second side 20e to the planar first side 20d of said annular seal 20. The annular groove 20h, annular flanges 20h' and 20h", protruding planar surface 20f, and recessed surface 20g form concentric rings around the central aperture 20c of the annular seal 20. Preferably, the annular seal 20 is sufficiently flexible to receive the larger diameter of the annular retaining ridge 18d of said fuel vent fitting 18 through the smaller diameter of the central aperture 20c of said annular seal.

Figure 6:
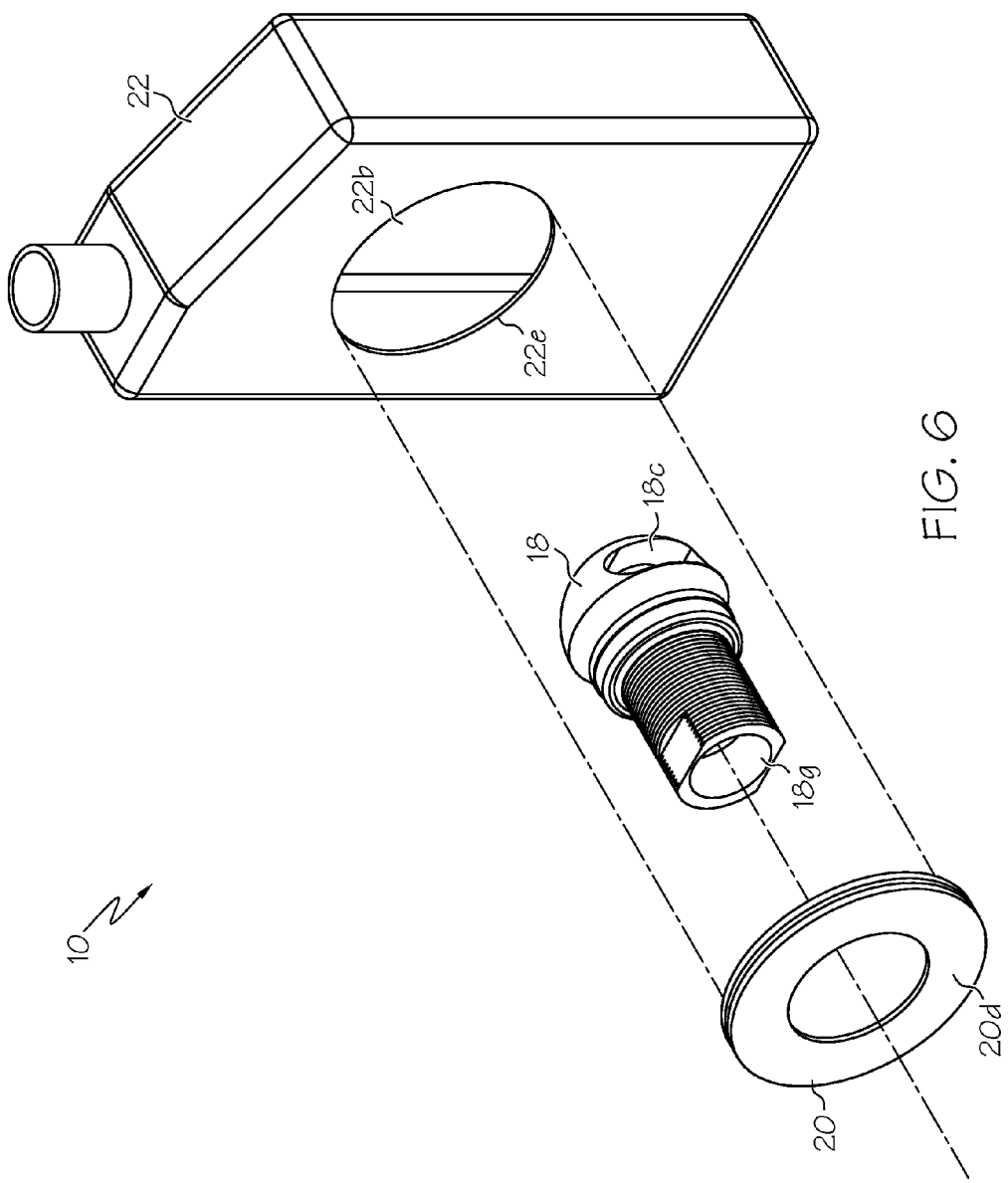
FIG. 6 shows an exploded view of the fuel vent recovery system.

As shown in FIGS. 1, 5 and 6, the recovery container 22 includes the aperture 22b, which has a radius that is slightly greater than the distance measured from the center of aperture 20c to the bottom of groove 20h between annular flanges 20h' and 20h". The wall 22e of the container's aperture 22b fits within groove 20h between annular flanges 20h' and 20h" to effectively join the annular ring seal 20 to the container 22 with a tight seal. The recovery container 22 collects and retains the fuel 12 discharged from the fuel vent discharge opening 18c so that said fuel may be stored for reuse or disposal. Like the other components of the fuel vent recovery system 10, the recovery container 22 is preferably constructed from one or more materials that are resistant to corrosion and degradation caused by exposure to hydrocarbon fuels. Said recovery container 22 also includes a top opening 22c that is located at a position higher than the fuel vent fitting 18 once said recovery container is installed. The top opening 22c permits gases discharged by the fuel vent 14 that have accumulated within the recovery container 22 to escape to the atmosphere, thereby preventing dangerous increases in pressure inside the fuel vent system. Said top opening 22c of the recovery container may be threaded for engaging a cap or lid 22d for closing and sealing the container 22.

Prior to using the fuel vent recovery system 10 to prevent fuel spillage from the vessel fuel vent 14, the annular ring seal 20 and container 22 must be assembled so that the perimeter wall 22e of the aperture 22b in the container 22 is completely enclosed within the groove 20h between annular flanges 20h' and 20h" of the annular ring seal 20. To install the annular ring seal 20 and container 22 onto the fuel vent fitting 18, the central aperture 20c of the annular seal 20 is aligned with the semi-spherical end 18b of said fuel vent fitting, and said annular seal and container assembly are pushed or pulled upon until end 18b and annular retaining ridge 18d of said fuel vent fitting pass through the central aperture of the annular seal. During installation, the outboard flange 18h of the fuel vent fitting 18 contacts the exterior surface of the vessel hull 16 and the planar first side 20d of said annular seal is fitted around and securely engaged by the flared seal interface surface 18e, part of which has a diameter greater than the diameter of the central aperture 20c of said annular seal. The annular seal 20 and recovery container 22 may not necessarily contact the surface of the vessel hull 16. The second side 20e of the annular ring 20 contacts the surface of the recovery container 22 when the fuel vent recovery system 10 is installed over the fuel vent 14 on the hull 16 of a vessel. The annular ring seal 20 is sufficiently pliable so that the interface between the inner wall 20b of the annular seal 20 and seal interface surface 18e of the fuel vent fitting 18 is effectively free of all voids to the environment.

The annular seal 20 and recovery container 22 are installed temporarily over the fuel vent fitting 18 on the hull 16 of the vessel as described hereafter. The side aperture 22b of the recovery container 22 and the semi-spherical end 18b and discharge opening or vent outlet 18c of the fuel vent fitting 18 are aligned so that said semi-spherical end and said discharge opening may be positioned through the side aperture 22b of the recovery container so as to be located within the void 22a defined by the recovery container. The wall 22e of the side aperture 22b is fitted securely within the groove 20h between annular flanges 20h' and 20h" of the annular seal 20. Thus, once installed, annular flange 20h' contacts the outer surface of the recovery container 22 while annular flange 20h" contacts the inner surface of the recovery container. The inner wall 20b of the annular seal 20 contacts the seal interface flare 18e of the fuel vent fitting 18. This contact and installation configuration of the recovery container's aperture wall 22e being disposed between the annular flanges 20h' and 20h" of said annular seal 20 supports the weight of the recovery container as said container fills with discharged fuel 12. Fuel 12 discharged from the fuel vent line 14 passes into the fuel vent fitting 18 through the interior void 18a inside the threaded hollow shank 18f and exits the vent outlet or discharge opening 18c of the fitting 18 where said fuel is collected and retained within the recovery container 22.

Figure 2:
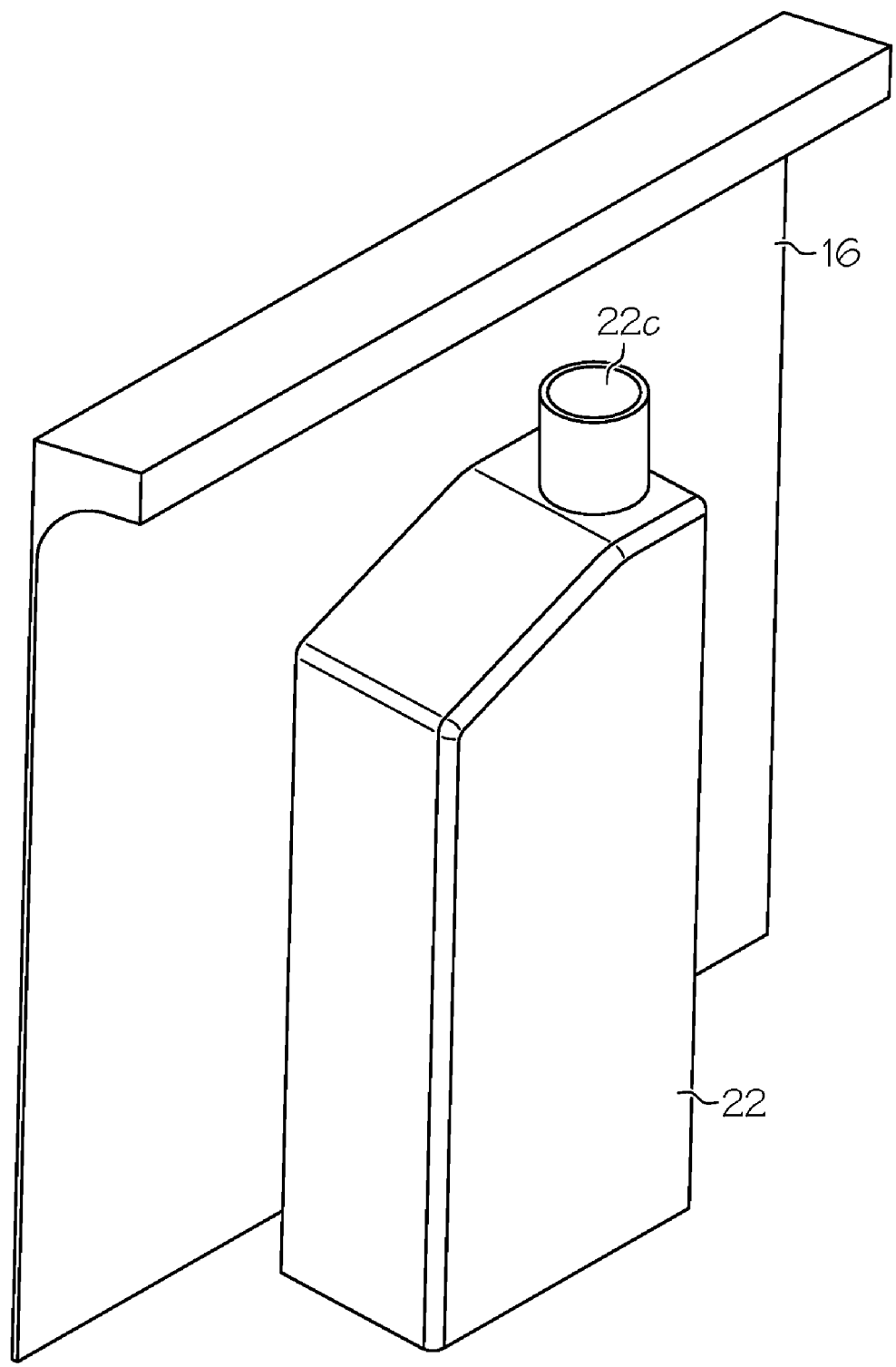
FIG. 2 shows a perspective view of the fuel vent recovery system connected to the hull of a vessel.

Gases that accumulate within the fuel tank of the vessel are discharged from the fuel vent 14 into the fuel vent fitting 18 where said gases pass into the recovery container 22 and exit the recovery container through the top opening 22c. Fuel collected within the recovery container may be saved for reuse to prevent waste or for disposal. The fuel vent recovery system 10 prevents hydrocarbon fuels discharged from vessel fuel vents 14 from spilling into the environment and contaminating the surrounding environment. FIGS. 1, 2, and 5 show the fuel vent recovery system 10 installed over a fuel vent 14 on the exterior of a vessel's hull 16.

Various sizes of recovery containers 22 may be used with the fuel vent recovery system 10, however, the recovery container selected for use must have a sufficiently large enough capacity to contain the volume of fuel 12 that may be discharged from the vessel fuel vent 14 when a discharge event occurs, such as during overfilling of the fuel tank. When fueling of the vessel is complete, the recovery container 22 and annular seal 20 are detached from the fuel vent fitting 18. Fuel 12 discharged from the fuel vent line 14 and captured by said recovery container 22 is poured back into the fuel tank line or is properly stored for later use. The recovery container 22 and annular seal 20 are also stored for use during refueling of the vessel.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A fuel vent recovery system for preventing and containing fuel spillage, comprising:

a hull-side fuel vent fitting, which comprises a vent and connects to a fuel vent passing through a hull of a vessel, said fuel vent fitting having an enlarged, bulbous, semi-spherical end;

said fuel vent fitting including a vent inlet for receiving fuel discharged from the fuel vent passing through the hull of the vessel, wherein said vent inlet comprises a hollow shank for connecting to the fuel vent, and said hollow shank surrounds and defines an interior void through which fuel discharged from the fuel vent passes;

said fuel vent fitting including an outboard flange that contacts and rests against the hull of the vessel;

said fuel vent fitting further including a seal interface surface that is flared and angularly enlarged towards said bulbous end;

an annular retaining ridge extending around the exterior circumference of said fitting;

said fuel vent fitting including a vent outlet having an opening for releasing fuel expelled from the vessel into the recovery container;

an annular ring seal having an outer wall and an inner wall defining a central aperture;

wherein said inner wall is firmly attached around an outer surface of the fuel vent fitting;

said fuel vent fitting flared seal interface surface contacting and engaging said annular seal; and a recovery container including:

a side aperture defined by a perimeter wall and having a diameter shaped and sized to fit securely over and with a groove in the annular seal; and a top opening that is located at a position higher than the fuel vent fitting once said recovery container is installed.

2. The fuel vent recovery system of claim 1, wherein the top opening permits gases to escape thereby preventing dangerous increases in pressure inside the recovery container.

3. The fuel vent recovery system of claim 1, wherein the annular seal is constructed from either natural or synthetic elastomer material that is resistant to corrosion or degradation caused by exposure to hydrocarbon fuels.

4. The fuel vent recovery system of claim 1, wherein the recovery container and fuel vent fitting are constructed from one or more materials that are resistant to corrosion and degradation caused by exposure to hydrocarbon fuels.

5. The fuel vent recovery system of claim 1, wherein the annular retaining ridge serves to impede fuel escaping the vent outlet from dripping or running back down the hollow shank to the hull vessel.

6. The fuel vent recovery system of claim 1, wherein the diameter of the annular retaining ridge is greater than the diameter of the hollow shank end of said fuel vent fitting.

7. The fuel vent recovery system of claim 1, wherein the diameter of the annular retaining ridge is greater than the diameter of the central aperture of the annular ring seal.

8. The fuel vent recovery system of claim 7, wherein the annular seal is sufficiently flexible to receive the larger diameter of the annular retaining ridge of said fuel vent fitting through the smaller diameter of the central aperture of said annular seal.

9. The fuel vent recovery system of claim 8, wherein the seal interface surface of the fuel vent fitting is flared and directly contacts the geometrically complementary inner wall of the annular seal.

10. The fuel vent recovery system of claim 9, wherein the vent outlet of the fuel vent fitting is positioned through the side aperture of the recovery container so as to be located within a void defined by the recovery container.

11. The fuel vent recovery system of claim 10, wherein fuel discharged from the fuel vent passes through the vent inlet and into an interior void within and defined by the hollow shank end of the fuel vent fitting and is discharged through the vent outlet where said fuel is collected and retained within the void of the recovery container.

12. The fuel vent recovery system of claim 1, wherein the annular seal includes a generally planar first side and a second side having a protruding planar surface encircling a recessed surface surrounding the central aperture of said annular ring seal;

wherein said protruding planar surface comprises an outer wall, an inner wall, and a top planar surface.

13. The fuel vent recovery system of claim 12, wherein the outer wall of the annular seal is bifurcated by an annular groove that forms two annular flanges on the surface of the outer wall;

wherein each annular flange comprises an outer surface, an inner surface, and a top surface;

wherein the first annular flange is coplanar with and forms part of the planar first side of said annular seal;

wherein the second annular flange is coplanar with and forms part of the protruding planar surface of the second side of said annular seal; and wherein the perimeter wall defining the recovery container aperture fits between and is secured by said annular flanges within the groove of the annular seal.

14. The fuel vent recovery system of claim 1, wherein the top opening of the recovery container is threaded for engaging a cap or lid.

\* \* \* \* \*